(12) United States Patent
Himukashi

(10) Patent No.: US 11,936,986 B2
(45) Date of Patent: Mar. 19, 2024

(54) IMAGE ADJUSTMENT SYSTEM, IMAGE ADJUSTMENT DEVICE, AND IMAGE ADJUSTMENT METHOD

(71) Applicant: JVCKENWOOD CORPORATION, Yokohama (JP)

(72) Inventor: Takashi Himukashi, Yokohama (JP)

(73) Assignee: JVCKENWOOD CORPORATION, Yokohama (JP)

(\*) Notice: Subject to any disclaimer, the term of this patent is extended or adjusted under 35 U.S.C. 154(b) by 365 days.

(21) Appl. No.: 17/304,989

(22) Filed: Jun. 29, 2021

(65) Prior Publication Data
US 2021/0329168 A1 Oct. 21, 2021

Related U.S. Application Data

(63) Continuation of application No. PCT/JP2020/004699, filed on Feb. 7, 2020.

(30) Foreign Application Priority Data

Feb. 15, 2019  (JP) .................. 2019-025335
Feb. 15, 2019  (JP) .................. 2019-025340
(Continued)

(51) Int. Cl.
*H04N 23/698* (2023.01)
*G06F 3/01* (2006.01)
(Continued)

(52) U.S. Cl.
CPC ........... *H04N 23/698* (2023.01); *G06F 3/014* (2013.01); *G06T 3/60* (2013.01); *H04N 23/53* (2023.01); *H04N 23/80* (2023.01)

(58) Field of Classification Search
CPC ...... H04N 23/698; H04N 23/80; H04N 23/53; G06F 3/012; G06F 3/013; G06F 3/014; G06T 3/60
See application file for complete search history.

(56) References Cited

U.S. PATENT DOCUMENTS

2007/0206030 A1  9/2007  Lukis
2009/0153477 A1  6/2009  Saenz
(Continued)

FOREIGN PATENT DOCUMENTS

EP   3155560 A1   4/2017
EP   3349183 A1   7/2018
(Continued)

OTHER PUBLICATIONS

Office Action dated Feb. 3, 2023 for application No. EP20755802.4.
(Continued)

*Primary Examiner* — Kyle M Lotfi
(74) *Attorney, Agent, or Firm* — Nath, Goldberg & Meyer; Jerald L. Meyer

(57) ABSTRACT

An image adjustment system and an image adjustment method include a camera, an image adjustment device, an image display device, and a controller. The image adjustment device includes an image generator and an image processor. The image generator generates a spherical image. The image processor acquires the spherical image from the image generator based on instruction information output from the controller and displays the spherical image on the image display device. The image processor rotates the spherical image based on the instruction information, and adjusts a captured image displayed on the image display device in accordance with the rotation of the spherical image.

12 Claims, 13 Drawing Sheets

(30) Foreign Application Priority Data

Feb. 15, 2019 (JP) .................................. 2019-025342
Feb. 15, 2019 (JP) .................................. 2019-025346

(51) Int. Cl.
*G06T 3/60* (2006.01)
*H04N 23/53* (2023.01)
*H04N 23/80* (2023.01)

(56) References Cited

U.S. PATENT DOCUMENTS

2013/0194305 A1    8/2013    Kakuta et al.
2018/0122042 A1    5/2018    Kim et al.

FOREIGN PATENT DOCUMENTS

| | | |
|---|---|---|
| JP | 2002-92117 A | 3/2002 |
| JP | 2005-56295 A | 3/2005 |
| JP | 2005-319136 A | 11/2005 |
| JP | 2007-116538 A | 5/2007 |
| JP | 2013-16020 A | 1/2013 |
| JP | 2016-528592 A | 9/2016 |

OTHER PUBLICATIONS

European Search Report dated Mar. 16, 2022 in corresponding EP application 20755802.4.

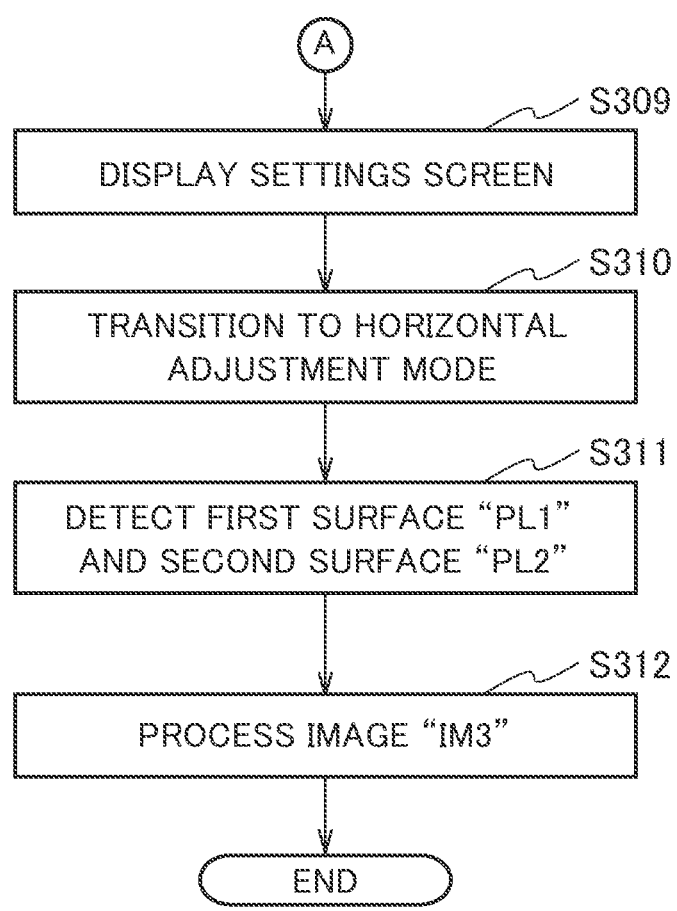

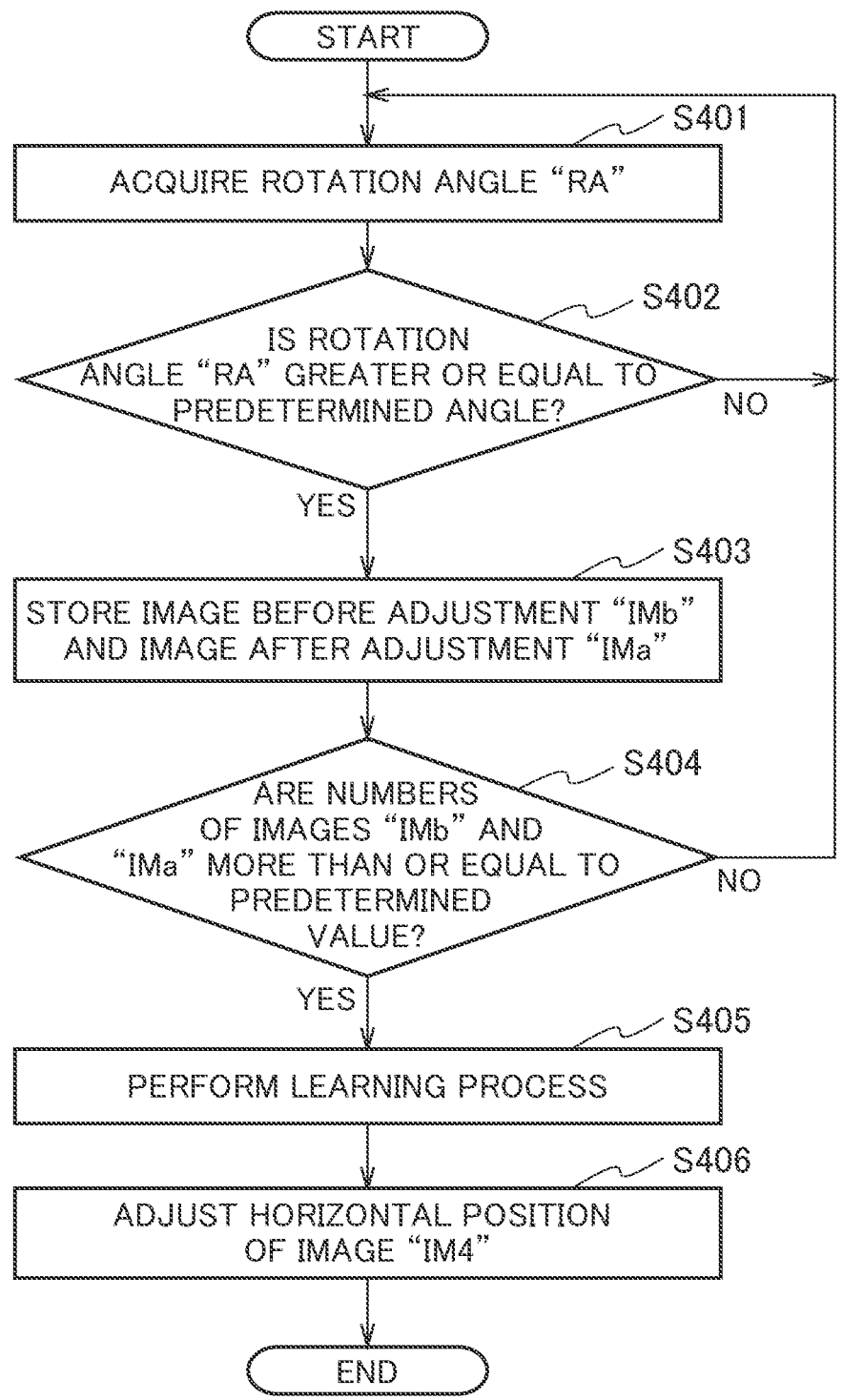

IMAGE ADJUSTMENT SYSTEM, IMAGE ADJUSTMENT DEVICE, AND IMAGE ADJUSTMENT METHOD

CROSS REFERENCE TO RELATED APPLICATIONS

This application is a Continuation of PCT Application No. PCT/JP2020/004699, filed on Feb. 7, 2020, and claims the priority of Japanese Patent Applications No. 2019-025335, No. 2019-025340, No. 2019-025342, and No. 2019-025346, each application filed on Feb. 15, 2019; the entire contents of the applications are incorporated herein by reference.

TECHNICAL FIELD

The present disclosure relates to an image adjustment system, an image adjustment device, and an image adjustment method.

RELATED ART

Recently, a head-mounted display has attracted attention as an image display device. The head-mounted display displays an image in a state of being mounted on a head of a user, and enable the user to obtain a sense of entering into a virtual space (immersion). As described in Patent Literature 1, the head-mounted display can display an image captured by an external camera through a neck work.

CITATION LIST

Patent Literature

Patent Literature 1: Japanese Patent Application Laid-Open No. 2005-56295

SUMMARY

However, a conventional head-mounted display had a difficulty in detecting a horizontal direction of an image depending on the displayed image, and the horizontal direction may be erroneously detected. In addition, the horizontal or zenith designation may be deviated due to problems such as system synchronization. When the horizontal direction of the image is erroneously detected or the horizontal or zenith designation is deviated, the user may feel a sense of incongruity, since the displayed image does not match the user's sense of gravity.

The present embodiment provides an image adjustment system, an image adjustment device, and an image adjustment method that can easily correct the horizontal or zenith of an image when the horizontal direction of the image is erroneously detected or the designation of the horizontal or zenith is deviated.

The image adjustment system according to the present embodiment includes a camera, an image adjustment device configured to adjust a captured image captured by the camera, an image display device configured to display the captured image adjusted by the image adjustment device, and a controller configured to output instruction information to the image adjustment device. The image adjustment device includes an image generator configured to generate a spherical image, an image processor configured to acquire the spherical image from the image generator based on the instruction information and display the spherical image on the image display device, and configured to rotate the spherical image based on the instruction information and adjust the captured image displayed on the image display device in accordance with the rotation of the spherical image.

An image adjustment device according to the present embodiment includes an image generator configured to generate a spherical image an image processor configured to acquire the spherical image from the image generator based on an instruction information acquired from a controller and display the spherical image on an image display device, and configured to rotate the spherical image based on the instruction information and adjust the captured image captured by a camera and displayed on the image display device in accordance with the rotation of the spherical image.

An image adjustment method according to the present embodiment acquires an instruction information from a controller with an image processor. A spherical image is acquired from an image generator with the image processor based on the instruction information. An image display device displays the spherical image. The spherical image is rotated with the image processor based on the instruction information. A captured image, which is captured by a camera and displayed on the image display device, is adjusted with the image processor in accordance with the rotation of the spherical image.

According to the image adjustment system, the image adjustment device, and the image adjustment method of the present embodiment, in a case the horizontal direction of the image is erroneously detected or the designation of the horizontal or zenith is deviated, the horizontal or zenith of the image can be easily corrected.

BRIEF DESCRIPTION OF DRAWINGS

FIG. 10B is a flowchart illustrating an example of the image adjustment method according to the third embodiment.

FIG. 11 is a flowchart illustrating an example of an image adjustment method according to a fourth embodiment.

DESCRIPTION OF EMBODIMENTS

Figure 1:
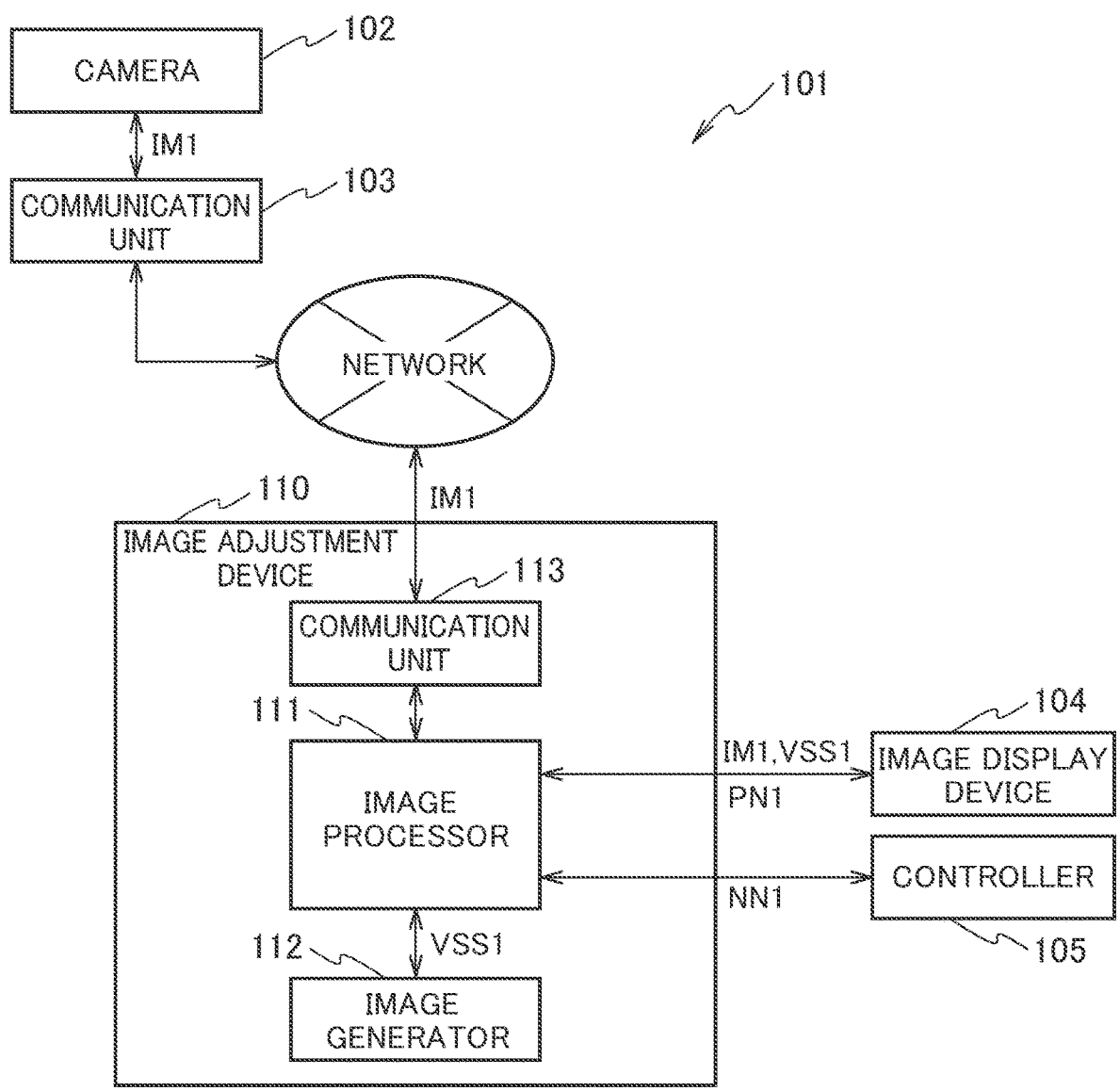
FIG. 1 is a block diagram illustrating an image adjustment system according to a first embodiment.

Embodiments will be described below with reference to the accompanying drawings. In the following drawings, the same or similar parts are denoted by the same or similar reference numerals. When only a part of the configuration is described in each embodiment, the configuration of the other embodiment described above can be applied to the other part of the configuration.

First Embodiment

A configuration example of an image adjustment system of a first embodiment will be described with reference to FIG. 1. The image adjustment system 101 includes a camera 102, a communication unit 103, an image display device 104, a controller 105, and an image adjustment device 110. The image adjustment device 110 has an image processor 111, an image generator 112, and a communication unit 113.

The camera 102 is an omnidirectional camera (360-degree camera) capable of capturing an image covering 360 degrees. The communication unit 103 and the communication unit 113 are connected via a network. The image adjustment device 110 can acquire a captured image IM1 captured by the camera 102 through the communication units 103 and 113 and a network.

Computer equipment may be used as the image adjustment device 110. A CPU (central processing unit) may be used as the image processor 111 and the image generator 112. The image generator 112 and the communication unit 113 may be provided outside the image adjustment device 110.

The captured image IM1 acquired by the image adjustment device 110 is input to the image processor 111, The image processor 111 analyzes the captured image IM1 and recognizes the horizontal direction of the captured image IM1, The image processor 111 may recognize the vertical direction of the captured image IM1 by analyzing the captured image IM1, or may recognize both the horizontal direction and the vertical direction of the captured image IM1. The image adjustment device 110 corrects distortion of the captured image IM1, performs image processing such as adjustment of the horizontal direction of the captured image IM1, and outputs the image-processed captured image IM1 to the image display device 104.

The image display device 104 displays the captured image IM1 subjected to image processing by the image adjustment device 110. The image display device 104 is, for example, a head-mounted display. The controller 105 is, for example, a glove-type controller used for VR (Virtual Reality).

Figure 2:
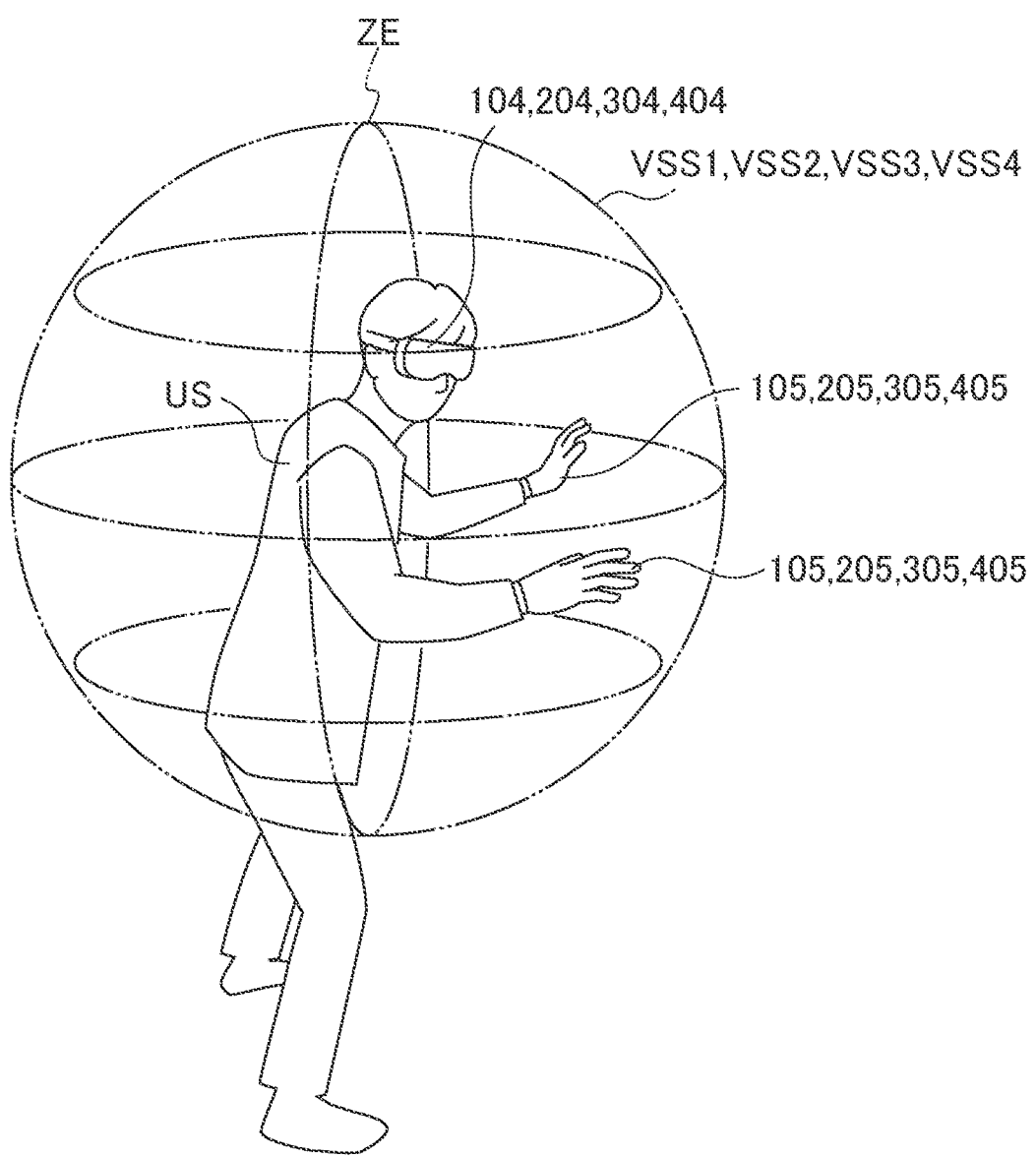
FIG. 2 is a figure illustrating a relationship between a spherical image and a user.

FIG. 2 schematically illustrates a state in which the image display device 104 is mounted on a head of a user US and the controller 105 is mounted on a hand of the user US. The symbol ZE in FIG. 2 indicates the zenith. It is desirable that the zenith of the camera 102 coincides with the zenith of the user US. By mounting the image display device 104 to the head of the user US, the user US can view the captured image IM1 subjected to image processing by the image adjustment device 110.

The image display device 104 generates attitude information PN1 based on a direction in which the user US faces and a state such as the attitude of the user US while the image display device 104 is mounted on the head of the user US. An image processor 111 acquires attitude information PN1 from the image display device 104. That is, the image processor 111 acquires the attitude information PN1 based on the attitude of the image display device 104. The image processor 111 displays, on the basis of the attitude information PN1, an image of an area in accordance with the direction in which the user US faces and the state such as the attitude of the user US from the captured image IM1 captured by the camera 102 on the image display device 104.

The controller 105 generates instruction information NN1 based on a state such as the movement or posture of the hand of the user US or the movement or posture of the finger of the user US in a state of being mounted on the hand of the user US. Hereinafter, the hand or finger is simply abbreviated as the hand. The image processor 111 acquires instruction information NN1 from the controller 105. The image processor 111 can change or adjust the captured image IM1 displayed on the image display device 104 based on the instruction information NN1.

The image generator 112 generates a spherical image VSS1, the spherical image VSS1 being a virtual image formed by CG (Computer Graphics) with a spherical surface. The image generator 112 stores the spherical image VSS1 in a built-in memory or an external memory.

The image processor 111 acquires the spherical image VSS1 from the image generator 112 based on the instruction information NN1, and displays the spherical image VSS1 on the image display device 104. FIG. 2 schematically illustrates an image of the user US when the user US sees the spherical image VSS1 displayed on the image display device 104 while the image display device 104 is mounted on the head of the user US.

While the image display device 104 is mounted on the head of the user US, when the user US sees the spherical image VSS1 displayed on the image display device 104, the spherical image VSS1 is arranged to surround the user US and the image display device 104 and is set to display within a range where the hand of the user US reaches the spherical image VSS1. The user US feels that the hand of the user US is in contact with the spherical image VSS1 by moving the hand on which the controller 105 is mounted to a position corresponding to the spherical image VSS1 displayed on the image display device 104.

The controller 105 may have an actuator placed at a part to be in contact with the hand of the user US. On the basis of the instruction information NM, the image processor 111 operates the actuator when it is determined that the hand of the user US has moved to a position corresponding to the spherical image VSS1. When the actuator applies pressure to the hand of the user US, the user US can actually feel the feeling that the hand is in contact with the spherical image VSS1.

In a state where the spherical image VSS1 is displayed on the image display device 104, when the user US moves the hand on which the controller 105 is mounted in an arbitrary direction, the image processor 111 performs image processing based on the instruction information NN1 so that the spherical image VSS1 and the captured image displayed on the image display device 104 move in accordance with the moving direction of the hand of the user US, the moving speed, and the position of the movement des ti nation.

The user US can rotate the spherical image VSS1 in any direction to any position at any speed by moving the hand in any direction to any position at any speed. That is, the user US can rotate the spherical image VSS1 by the movement of the hand. The image processor 111 moves the captured image IM1 in accordance with a rotation of the spherical image VSS1.

The image processor 111 can determine to which position on the coordinate of the spherical image VSS1 the zenith ZE of the spherical image VSS1 before being rotated by the user US has moved by the user US rotating the spherical image VSS1. The image processor 111 calculates a variation of the spherical image VSS1 before and after the user US rotates the spherical image VSS1 based on the moving direction and the position of the moving destination of the zenith ZE on the coordinate of the spherical image VSS1.

The variation of the spherical image VSS1 corresponds to an amount of rotation (rotation angle) of the spherical image VSS1 obtained by combining the amount of rotation (rotation angle) about the X axis, the amount of rotation (rotation angle) about the Y axis, and the amount of rotation (rotation angle) about the Z axis in the spherical image VSS1. An image processor 111 stores the variation of the spherical image VSS1 as a correction value CV1. That is, the correction value CV1 is calculated based on the rotational direction of the spherical image VSS1 and the amount or angle of movement of the zenith ZE, that is, the rotational angle of the spherical image VSS1.

The image processor 111 may store the coordinates on the spherical image VSS1 of the zenith ZE after the user US has rotated the spherical image VSS1 as the correction value CV1. The image processor 111 stores the correction value CV1 in the built-in memory or in the external memory.

The image processor 111 detects the horizontal direction of the captured image IM1. However, the image processor 111 may be erroneously detect the horizontal direction of the captured image IM1, since it is difficult to detect the horizontal direction depending on the captured image IM1. In addition, the horizontal or zenith designation may be deviated due to problems such as system synchronization. In a case the horizontal direction of the captured image IM1 is erroneously detected or in a case the horizontal or zenith designation is deviated, the user US may feel a sense of incongruity, since the captured image IM1 displayed on the image display device 104 does not coincide with the gravity sensation of the user US.

An example of the image adjustment method according to the first embodiment will be described with reference to the flowchart illustrated in FIG. 3. Specifically, an example of a method of adjusting the horizontal position of the captured image IM1 will be described. The image display device 104 is mounted on the head of the user US, and the controller 105 is mounted on the hand of the user US. The image display device 104 is displays a captured image IM1.

Figure 3:
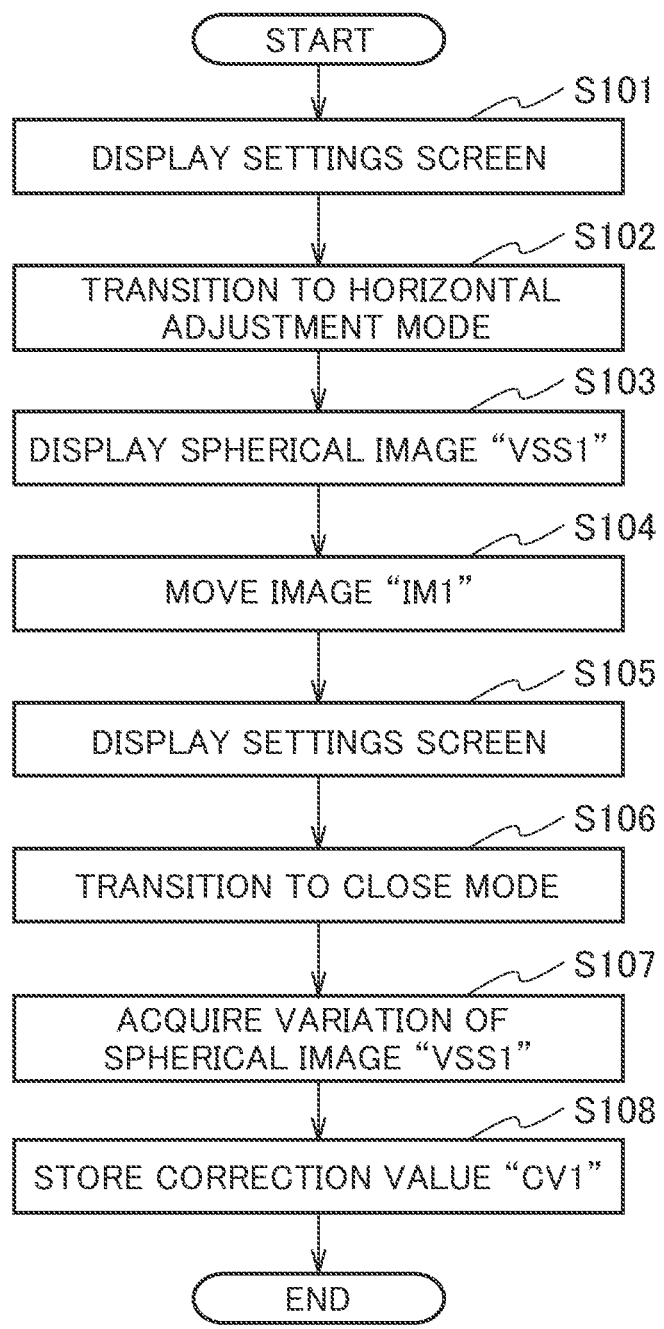
FIG. 3 is a flowchart illustrating an example of an image adjustment method according to the first embodiment.

If the user US determines that the captured image IM1 displayed on the image display device 104 is not horizontal, in FIG. 3, the user US operates the controller 105 so that the image processor 111 causes the image display device 104 to display a setting screen in step S101. When the user US operates the controller 105 so as to select a predetermined item (for example, horizontal adjustment items) displayed on the setting screen, the image processor 111 shifts the processing to a predetermined processing mode corresponding to the selected item in step S102. When the item of horizontal adjustment is selected, the image processor 111 shifts the processing to a processing mode for adjusting the horizontal of the captured image IM1, that is, a horizontal adjustment mode.

In step S103, the image processor 111 acquires the spherical image VSS1 from the image generator 112 and displays the spherical image VSS1 on the image display device 104. In an image display device 104, the captured image IM1 and the spherical image VSS1 are mixed and displayed. When the user US rotates the spherical image VSS1 so that the captured image IM1 is horizontal, the image processor 111 moves the captured image IM1 displayed on the image display device 104 in step S104 in accordance with the rotation of the spherical image VSS1. The user US may rotate the spherical image VSS1 a plurality of times until the captured image IM1 becomes horizontal.

When the user US determines that the captured image IM1 is horizontal, the user US operates the controller 105 so that the image processor 111, in step S105, causes the image display device 104 to display a setting screen. By making the captured image IM1 displayed on the image display device 104 horizontal, the zenith of the camera 102 and the zenith of the user US can be matched.

When the user US operates the controller 105 to select a predetermined item displayed on the setting screen, for example, an end item, the image processor 111 shifts the processing to a predetermined processing mode corresponding to the selected item in step S106. When the end item is selected, the image processor 111 shifts the processing to a processing mode for ending the horizontal adjustment, that is, an end mode.

In step S107, the image processor 111 acquires the amount of rotation (rotation angle) before and after the rotation of the spherical image VSS1 as the variation of the spherical image VSS1. In step S108, the image processor 111 stores the variation of the spherical image VSS1 as the correction value CV1, and ends the process.

In the image adjustment system 101, the image adjustment device 110, and the image adjustment method according to the first embodiment, the image display device 104 displays the spherical image VSS1. According to the image adjustment system 101, the image adjustment device 110, and the image adjustment method of the first embodiment, in a case the horizontal direction of the captured image IM1 is erroneously detected or in a case the designation of horizontal or zenith ZE is deviated, the user US operates the controller 105 to rotate the spherical image VSS1, so that the captured image IM1 displayed on the image display device 104 can be adjusted to be horizontal.

Therefore, according to the image adjustment system 101, the image adjustment device 110, and the image adjustment method of the first embodiment, in a case the horizontal direction of the captured image IM1 is erroneously detected or the designation of the horizontal or zenith is shifted, the user US can easily correct the horizontal or zenith of the captured image IM1.

According to the image adjustment system 101, the image adjustment device 110, and the image adjustment method of the first embodiment, in a case the correction value CV1 is stored, the image processor 111 reads the correction value CV1, adjusts the captured image IM1 captured by the camera 102 based on the correction value CV1, and displays the image on the image display device 104.

Second Embodiment

Figure 4:
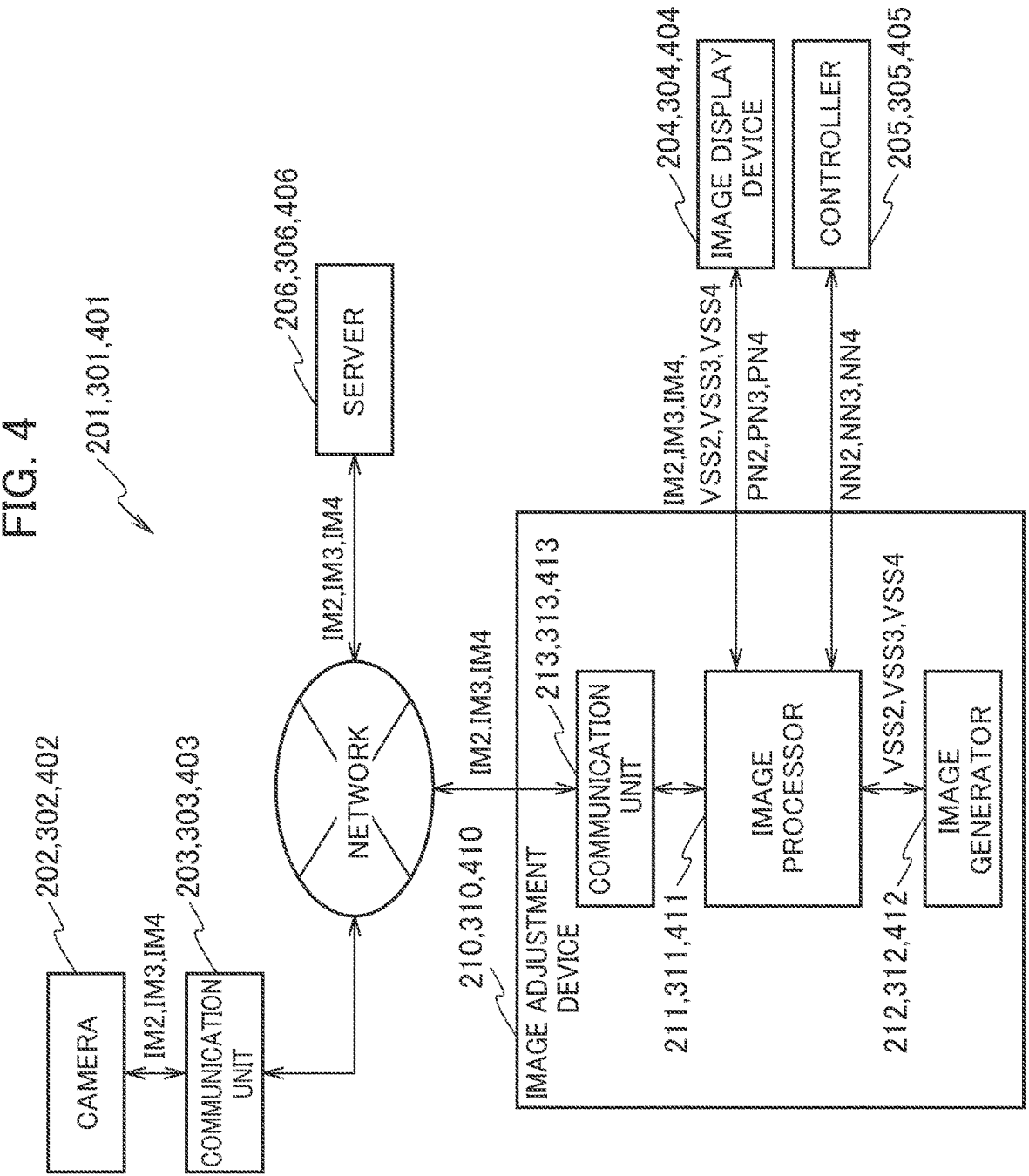
FIG. 4 is a block diagram illustrating an image adjustment system according to second embodiment, third embodiment, and fourth embodiment.

A configuration example of the image adjustment system according to a second embodiment will be described with reference to FIG. 4. The image adjustment system 201 includes a camera 202, a communication unit 203, an image display device 204, a controller 205, an image adjustment device 210, and a server 206. The image adjustment device 210 has an image processor 211, an image generator 212, and a communication unit 213.

The camera 202, the communication unit 203, the image display device 204, the controller 205, and the image adjustment device 210 correspond to the camera 102, the communication unit 103, the image display device 104, the controller 105, and the image adjustment device 110 of the first embodiment, respectively. The image processor 211, the image generator 212, and the communication unit 213 correspond to the image processor 111, the image generator 112, and the communication unit 113 of the first embodiment, respectively.

The image adjustment device 210 can acquire the captured image IM2 captured by the camera 202 through the communication units 203 and 213 and a network. The server 206 is connected through a network and a communication unit 203 to the camera 202, and connected through the network and the communication unit 213 to the image adjustment device 210.

The server 206 may acquire the captured image IM2 captured by the camera 202 via the communication unit 203 and the network, and the image adjustment device 210 may acquire the captured image IM2 from the server 206 via the network and the communication unit 213.

The captured image IM2 acquired by the image adjustment device 210 is input to the image processor 211. The image processor 211 analyzes the captured image IM2 to recognize the horizontal direction of the captured image IM2. The image processor 211 may analyze the captured image IM2 to recognize the vertical direction in the captured image IM2, or may recognize the horizontal direction and the vertical direction. The image adjustment device 210 corrects distortion of the captured image IM2, performs image processing such as adjustment of the horizontal position of the captured image IM2, and outputs the image-processed captured image IM2 to the image display device 204. The image display device 204 displays the captured image IM2 subjected to image processing by the image adjustment device 210.

The server 206 may correct distortion of the captured image IM2 captured by the camera 202, may perform image processing such as adjusting the horizontal position of the captured image IM2, and may output the image-processed captured image IM2 to the image adjustment device 210. By mounting the image display device 204 to the head of the user US, the user US can view the captured image IM2 subjected to image processing by the image adjustment device 210 or the server 206.

The image display device 204 generates attitude information PN2 based on a direction in which the user US faces and a state such as the attitude of the user US in a state of being mounted on the head of the user US. An image processor 211 acquires attitude information PN2 from an image display device 204. That is, the image processor 211 acquires the attitude information PN2 based on the attitude of the image display device 204, The image processor 211 displays, on the basis of the posture information PN2, an image of an area corresponding to the direction in which the user US faces and the posture of the user US from the captured image IM2 captured by the camera 202 on the image display device 204.

The controller 205 generates instruction information NN2 based on a state such as the movement or posture of the hand of the user US in the state of being mounted on the hand of the user US. The image processor 211 acquires instruction information NN2 from the controller 205. The image processor 211 can change or adjust the image displayed on the image display device 204 based on the instruction information NN2.

The image generator 212 generates a spherical image VSS2, the spherical image VSS2 being a virtual image formed by CG with a spherical surface. The image generator 212 stores the spherical image VSS2 in a built-in memory or an external memory.

The image processor 211 acquires the spherical image VSS2 from the image generator 212 based on the instruction information NN2, and displays the spherical image VSS2 on the image display device 204. The spherical image VSS2 corresponds to the spherical image VSS1 of the first embodiment. The user US feels that the hand of the user US is in contact with the spherical image VSS2 by moving the hand on which the controller 205 is mounted to a position corresponding to the spherical image VSS2 displayed on the image display device 204.

The controller 205 may have an actuator placed at a part to be in contact with the hand of the user US. On the basis of the instruction information NN2, the image processor 211 operates the actuator when it is determined that the hand of the user US has moved to a position corresponding to the spherical image VSS2. When the actuator applies pressure to the hand of the user US, the user US can actually feel the feeling that the hand is in contact with the spherical image VSS2.

In a state where the spherical image VSS2 is displayed on the image display device 204, when the user US moves the hand on which the controller 205 is mounted in an arbitrary direction, the image processor 211 performs image processing based on the instruction information NN2 so that the spherical image VSS2 and the captured image IM2 displayed on the image display device 204 move in accordance with the moving direction of the hand of the user US, the moving speed, and the position of the movement destination.

The user US can rotate the spherical image VSS2 in any direction at any speed to any position by moving the hand in any direction at any speed to any position. That is, the user US can rotate the spherical image VSS2 by the movement of the hand. The image processor 211 moves the captured image IM2 in accordance with the rotation of the spherical image VSS2.

The image processor 211 can determine to which position on the coordinate of the spherical image VSS2 the zenith ZE of the spherical image VSS2 before being rotated by the user US has moved by the user US rotating the spherical image VSS2. The image processor 211 calculates a variation of the spherical image VSS2 before and after the user US rotates the spherical image VSS2 based on the moving direction and the position of the moving destination of the zenith ZE on the coordinate of the spherical image VSS2. The variation of the spherical image VSS2 corresponds to the variation of the spherical image VSS1 of the first embodiment.

The image processor 211 outputs the variation of the spherical image VSS2 as the correction value CV2 to the server 206 via the communication unit 213 and the network. That is, the correction value CV2 is calculated based on the rotation direction of the spherical image VSS2 and the amount or angle of movement of the zenith ZE, the angle of movement of the zenith ZE being a rotation angle of the spherical image VSS2. The image processor 211 may output the coordinates on the spherical image VSS2 of the zenith ZE after the user US has rotated the spherical image VSS2 as the correction value CV2 to the server 206.

The server 206 may acquire the correction value CV2 from the image adjustment device 210 through the network and the communication unit 213. The server 206 stores the correction value CV2 in the built-in memory or the external memory in association with the user US or the image display device 204.

The image processor 211 detects the horizontal direction of the captured image IM2. However, the image processor 211 may be erroneously detect the horizontal direction of the captured image IM2, since it is difficult to detect the horizontal direction depending on the captured image IM2. In addition, the horizontal or zenith designation may be shifted due to problems such as system synchronization. In a case the horizontal direction of the captured image IM2 is erroneously detected or in a case the horizontal or zenith designation is deviated, the user US may feel a sense of incongruity, since the captured image IM2 displayed on the image display device 204 does not coincide with the gravity sensation of the user US.

When the user US mounts the image display device 204 on the head, the shape of the head and the mounted state of the image display device 204 are different depending on the user US. Therefore, the horizontal direction of the captured image IM2 displayed on the image display device 204 may vary depending on the user US. Further, the horizontal direction of the captured image IM2 displayed on the image display device 204 may vary depending on the dominant eye of the user US. Therefore, the correction value CV2 may vary depending on the user US.

Figure 5:
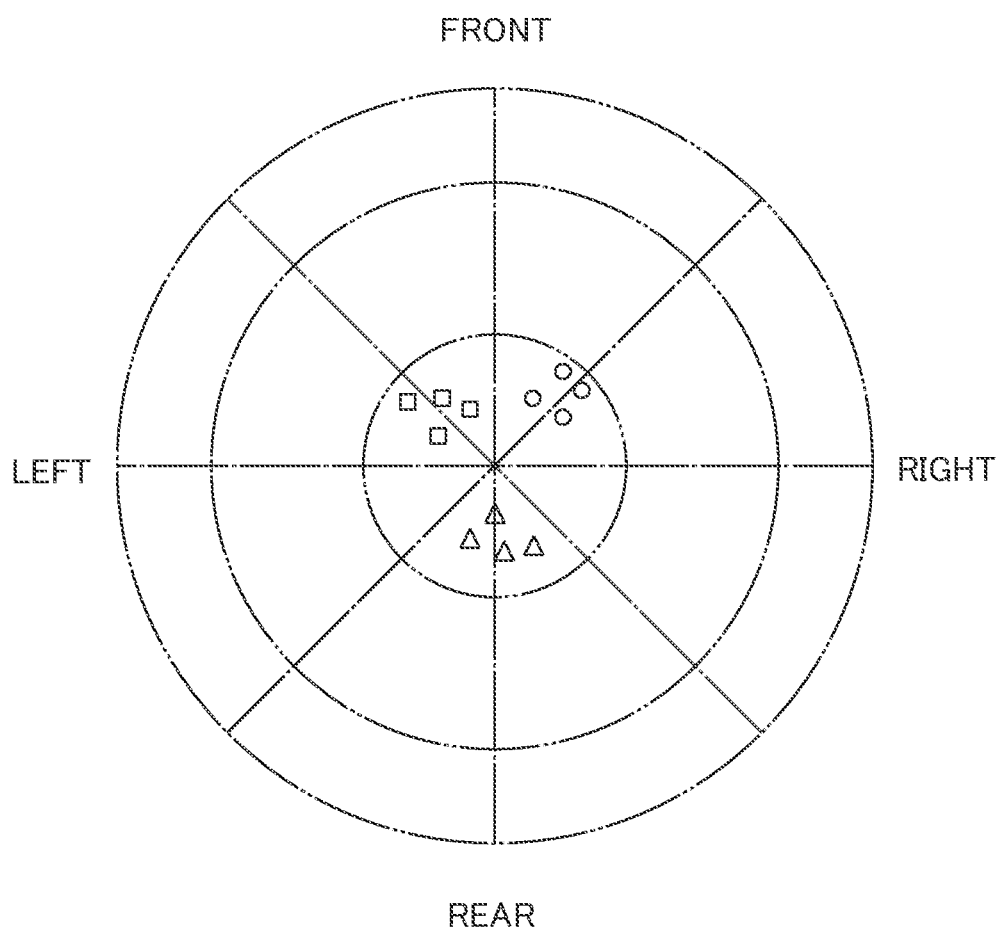
FIG. 5 is a figure illustrating an example of a distribution of correction values for each user.

FIG. 5 schematically illustrates the distribution of the correction value CV2 for each user US. FIG. 5 schematically illustrates a state where the spherical image VSS2 is viewed from above the user US. In FIG. 5, "FRONT" indicates a front side of the user US, and "REAR" indicates a rear side of the user US. In FIG. 5, "RIGHT" indicates a right side of the user US, and "LEFT" indicates a left side of the user US.

Round-shaped symbols illustrated in FIG. 5 indicates the correction value CV2 for a first user US or a first image display device 204, square-shaped symbols indicates the correction value CV2 for a second user US or a second image display device 204, and triangular-shaped symbols indicates the correction value CV2 for a third user US or a third image display device 204. In FIG. 5, the correction values CV2 are distributed to the front right side for the first user US, to the front left side for the second user US, and to the rear side for the third user US.

The server 206 can specify the user US or the image display device 204 by performing a login operation by the user US or by connecting the image display device 204 to a network via the communication unit 213. The server 206 stores the correction value CV2 in association with the specified user US or the specified image display device 204.

An example of the image adjustment method of the second embodiment will be described with reference to flowcharts illustrated in FIGS. 6 and 7. Specifically, an example of a method of adjusting the horizontal position of the captured image IM2 for each user US or each image display device 204 will be described. The image display device 204 is mounted on the head of the user US, and the controller 205 is mounted on the hand of the user US. The image display device 204 displays a captured image IM2.

Figure 6:
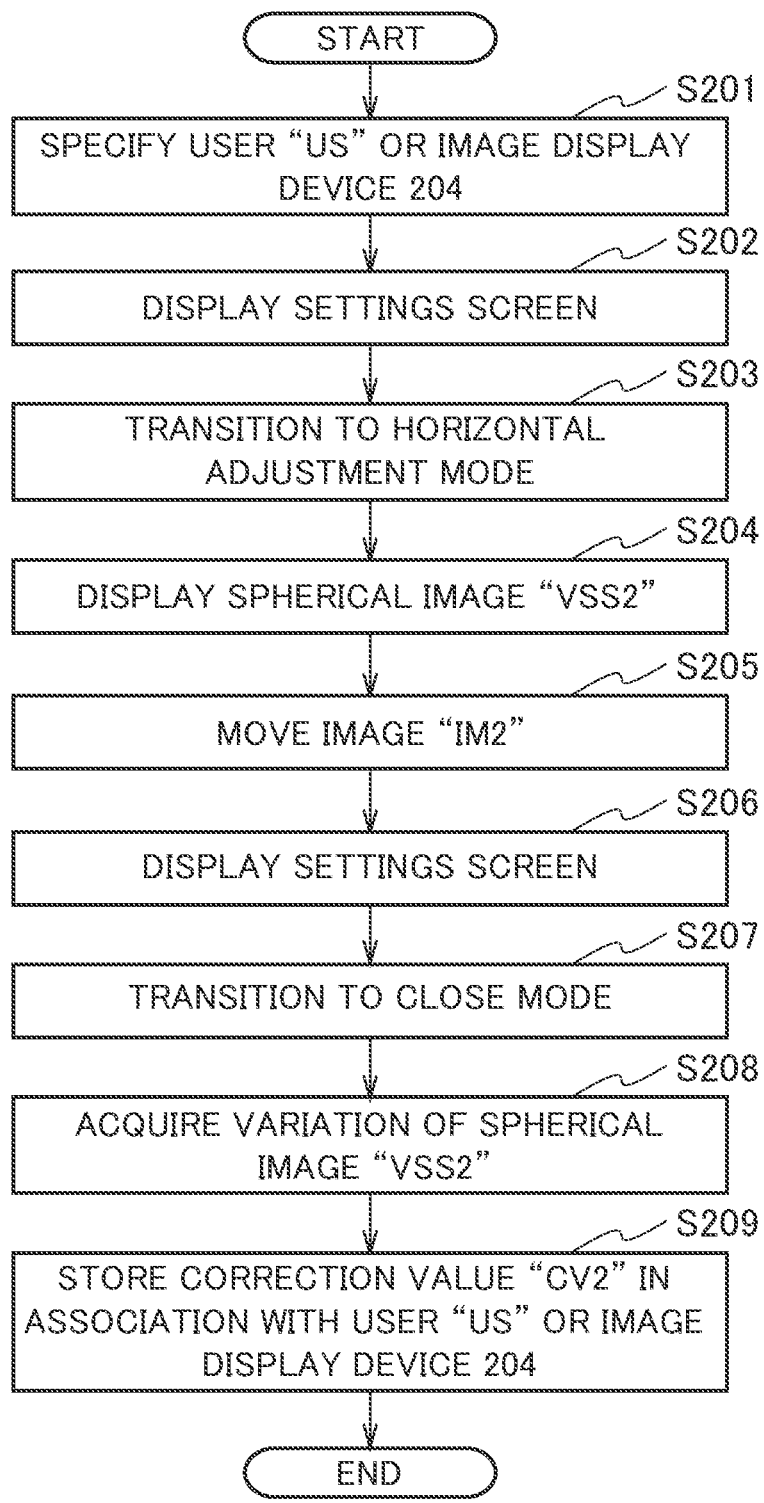
FIG. 6 is a flowchart illustrating an example of an image adjustment method according to the second embodiment.

In FIG. 6, in step S201, the server 206 specifies the user US or the image display device 204 by the user US performing a login operation or by the image display device 204 being connected to the network via the communication unit 213.

If the user US determines that the captured image IM2 displayed on the image display device 204 is not horizontal, the user US operates the controller 205 so that the image processor 211 causes the image display device 204 to display a setting screen in step S202. When the user US operates the controller 205 to select a predetermined item displayed on the setting screen, for example, an item for horizontal adjustment, the image processor 211 shifts the processing to a predetermined processing mode corresponding to the selected item in step S203. When the item of horizontal adjustment is selected, the image processor 211 shifts the processing to a processing mode for adjusting the horizontal of the captured image IM2, that is, a horizontal adjustment mode.

In step S204, the image processor 211 acquires the spherical image VSS2 from the image generator 212 and displays the spherical image VSS2 on the image display device 204. In an image display device 204, the captured image IM2 and the spherical image VSS2 are mixed and displayed. When the user US rotates the spherical image VSS2 so that the captured image IM2 is horizontal, the image processor 211 moves the captured image IM2 displayed on the image display device 204 in step S205 in accordance with the rotation of the spherical image VSS2. The user US may rotate the spherical image VSS2 a plurality of times until the captured image IM2 becomes horizontal.

When the user US determines that the captured image IM2 is horizontal, the user US operates the controller 205 so that the image processor 211, in step S206, causes the image display device 204 to display a setting screen. By making the captured image IM2 displayed on the image display device 204 horizontal, the zenith of the camera 202 and the zenith of the user US can be matched.

When the user US operates the controller 205 to select a predetermined item displayed on the setting screen, for example, an end item, the image processor 211 shifts the processing to a predetermined processing mode corresponding to the selected item in step S207, When the end item is selected, the image processor 211 shifts the processing to a processing mode for ending the horizontal adjustment, that is, an end mode.

In step S208, the image processor 211 acquires the amount of rotation (rotation angle) before and after the rotation of the spherical image VSS2 as the variation of the spherical image VSS2. Further, the image processor 211 outputs the variation of the spherical image VSS2 as the correction value CV2 to the server 206 via the communication unit 213 and the network. In step S209, the server 206 stores the correction value CV2 in association with the user US or the image display device 204. Note that the server 206 may acquire the correction value CV2 from the image adjustment device 210 via the network and the communication unit 213.

With reference to the flowchart illustrated in FIG. 7, an example of a method of adjusting the horizontal position of the captured image IM2 in a case the correction value CV2 is stored in the server 206 in association with the user US or the image display device 204 will be described. The image display device 204 is mounted on the head of the user US, and the controller 205 is mounted on the hand of the user US. The image display device 204 displays a captured image IM2.

Figure 7:
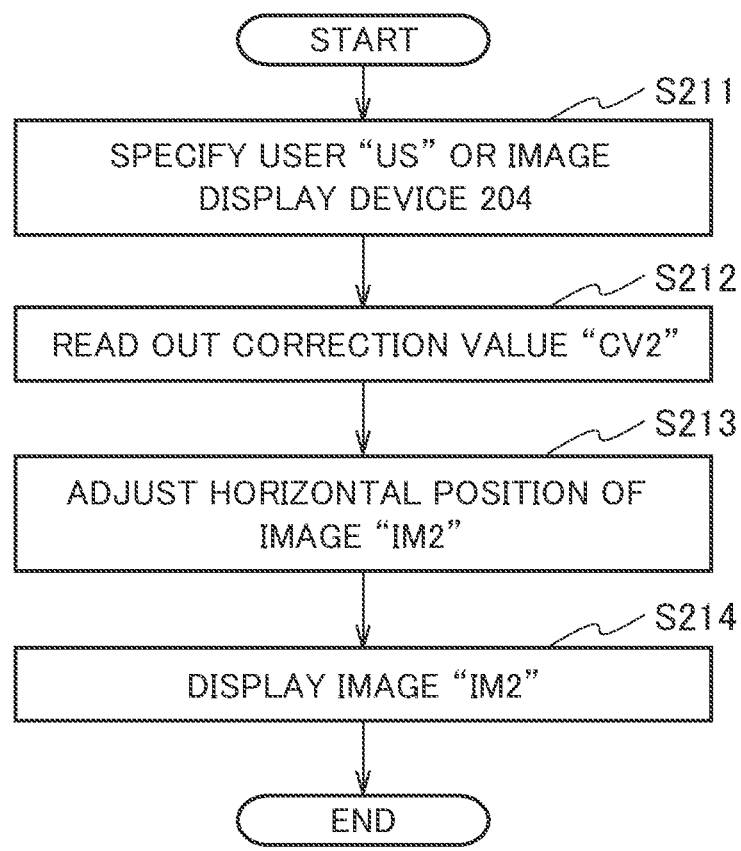
FIG. 7 is a flowchart illustrating an example of an age adjustment method according to the second embodiment.

In FIG. 7, in step S211, the server 206 specifies the user US or the image display device 204 by the user US performing a login operation or by the image display device 204 being connected to the network via the communication unit 213.

In step S212, the server 206 reads the correction value CV2 corresponding to the user US or the image display device 204 specified in step S211, and outputs the correction value CV2 to the image adjustment device 210 via the network and the communication unit 213.

In a case the server 206 stores a plurality of correction values CV2 corresponding to the user US or the image display device 204, the server 206 may calculate an average value from the plurality of correction values CV2 and may output the average value as the correction value CV2 to the image adjustment device 210, or may output the most recent correction value CV2 among the plurality of correction values CV2 to the image adjustment device 210. The image adjustment device 210 may read the correction value CV2 corresponding to the user US or the image display device 204 from the server 206 via the communication unit 213 and the network.

The correction value CV2 output from the server 206 to the image adjustment device 210 is input to the image processor 211. In step S213, the image processor 211 horizontally adjusts the captured image 142 captured by the camera 202 based on the correction value CV2, and outputs the horizontally adjusted image IM2 to the image display device 204. In step S214, the image display device 204 displays the captured image IM2 horizontally adjusted based on the correction value CV2. Therefore, the image display device 204 can display the captured image IM2 horizontally adjusted in accordance with the specified user US.

If the user US determines that the captured image IM2 displayed on the image display device 204 is not horizontal, the user US may operate the controller 205 to cause the image adjustment system 201 to perform the processes of steps S202 to S209 and steps S211 to S214.

In the image adjustment system 201, the image adjustment device 210, and the image adjustment method according to the second embodiment, the image display device 204 displays the spherical image VSS2. According to the image adjustment system 201, the image adjustment device 210, and the image adjustment method of the second embodiment, in a case the horizontal direction of the captured image IM2 is erroneously detected or in a case the designation of horizontal or zenith ZE is deviated, the user US operates the controller 205 to rotate the spherical image VSS2, so that the captured image IM2 displayed on the image display device 204 can be adjusted to be horizontal.

Therefore, according to the image adjustment system 201, the image adjustment device 210, and the image adjustment method of the second embodiment, in a case the horizontal direction of the captured image IM2 is erroneously detected or the designation of the horizontal or zenith is shifted, the user US can easily correct the horizontal or zenith of the captured image IM2.

In the image adjustment system 201, the image adjustment device 210, and the image adjustment method of the second embodiment, the correction value CV2 is associated with the user US or the image display device 204 and stored in the server 206. The image adjustment device 210 horizontally adjusts the captured image IM2 captured by the camera 202 for each user US or each image display device 204 based on the correction value CV2, and can display it on the image display device 204. According to the image adjustment system 201, the image adjustment device 210, and the image adjustment method of the second embodiment, since the correction value CV2 is associated with the user US or the image display device 204, the horizontal of the captured image IM2 can be adjusted for each of the plurality of users US.

Third Embodiment

A configuration example of the image adjustment system according to a third embodiment will be described with reference to FIG. 4. The image adjustment system 301 includes a camera 302, a communication unit 303, an image display device 304, a controller 305, an image adjustment device 310, and a server 306. The image adjustment device 310 has an image processor 311, an image generator 312, and a communication unit 313.

The camera 302, the communication unit 303, the image display device 304, the controller 305, the image adjustment device 310, and the server 306 correspond to the camera 202, the communication unit 203, the image display device 204, the controller 205, the image adjustment device 210, and the server 206 of the second embodiment, respectively. The image processor 311, the image generator 312, and the communication unit 313 correspond to the image processor 211, the image generator 212, and the communication unit 213 of the second embodiment, respectively.

The image adjustment device 310 can acquire the captured image IM3 captured by the camera 302 through the communication units 303 and 313 and a network. The server 306 is connected through a network and a communication unit 303 to the camera 302, and connected through the network and the communication unit 313 to the image adjustment device 310.

The server 306 may acquire the captured image IM3 captured by the camera 302 via the communication unit 303 and the network, and the image adjustment device 310 may acquire the captured image IM3 from the server 306 via the network and the communication unit 313.

The captured image IM3 acquired by the image adjustment device 310 is input to the image processor 311. The image processor 311 analyzes the captured image IM3 to recognize the horizontal direction of the captured image IM3. The image processor 311 may analyze the captured image IM3 to recognize the vertical direction in the captured image IM3, or may recognize the horizontal direction and the vertical direction. The image adjustment device 310 corrects distortion of the captured image performs image processing such as adjustment of the horizontal position of the captured image IM3, and outputs the image-processed captured image IM3 to the image display device 304. The image display device 304 displays the captured image IM3 subjected to image processing by the image adjustment device 310.

The server 306 may correct distortion of the captured image IM3 captured by the camera 302, may perform image processing such as adjusting the horizontal position of the captured image IM3, and may output the image-processed captured image IM3 to the image adjustment device 310. By mounting the image display device 304 to the head of the user US, the user US can view the captured image IM3 subjected to image processing by the image adjustment device 310 or the server 306.

The image display device 304 generates attitude information PN3 based on a direction in which the user US faces and a state such as the attitude of the user US in a state of being mounted on the head of the user US. An image processor 311 acquires attitude information PN3 from an image display device 304. That is, the image processor 311 acquires the attitude information PN3 based on the attitude of the image display device 304. The image processor 311 displays, on the basis of the posture information PN3, an image of an area corresponding to the direction in which the user US faces and the posture of the user US from the captured image IM3 captured by the camera 302 on the image display device 304.

The controller 305 generates instruction information NN3 based on a state such as the movement or posture of the hand of the user US in a state of being mounted on the hand of the user US. The image processor 311 acquires instruction information NN3 from a controller 305. The image processor 311 can change or adjust the image displayed on the image display device 304 based on the instruction information NN3.

The image generator 312 generates a spherical image VSS3, the spherical image VSS3 being a virtual image formed by CG with a spherical surface. The image generator 312 stores the spherical image VSS3 in a built-in memory or an external memory.

The image processor 311 acquires the spherical image VSS3 from the image generator 312 based on the instruction information NN3, and displays the spherical image VSS3 on the image display device 304. The spherical image VSS3 corresponds to the spherical images VSS1 and VSS2 of the first and second embodiments. The user US feels that the hand of the user US is in contact with the spherical image VSS3 by moving the hand on which the controller 305 is mounted to a position corresponding to the spherical image VSS3 displayed on the image display device 304.

The controller 305 may have an actuator placed at a part to be in contact with the hand of the user US. On the basis of the instruction information NN3, the image processor 311 operates the actuator when it is determined that the hand of the user US has moved to a position corresponding to the spherical image VSS3. When the actuator applies pressure to the hand of the user US, the user US can actually feel the feeling that the hand is in contact with the spherical image VSS3.

In a state where the spherical image VSS3 is displayed on the image display device 304, when the user US moves the hand on which the controller 305 is mounted in an arbitrary direction, the image processor 311 performs image processing based on the instruction information NN3 so that the spherical image VSS3 and the captured image IM3 displayed on the image display device 304 move in accordance with the moving direction of the hand of the user US, the moving speed, and the position of the movement des ti nation.

The user US can rotate the spherical image VSS3 in any direction at any speed to any position by moving the hand in any direction at any speed to any position. That is, the user US can rotate the spherical image VSS3 by the movement of the hand. The image processor 311 moves the captured image IM3 in accordance with the rotation of the spherical image VSS3.

The image processor 311 can determine to which position on the coordinate of the spherical image VSS3 the zenith ZE of the spherical image VSS3 before being rotated by the user US has moved by the user US rotating the spherical image VSS3. The image processor 311 calculates a variation of the spherical image VSS3 before and after the user US rotates the spherical image VSS3 based on the moving direction and the position of the moving destination of the zenith ZE on the coordinate of the spherical image VSS3. The variation of the spherical image VSS3 corresponds to the variation of the spherical images VSS1 and VSS2 of the first and second embodiments.

The image processor 311 outputs the variation of the spherical image VSS3 as the correction value CV3 to the server 306 via the communication unit 313 and the network. That is, the correction value CV3 is calculated based on the rotation direction of the spherical image VSS3 and the amount or angle of movement of the zenith ZE, the angle of movement of the zenith ZE being a rotation angle of the spherical image VSS3. The image processor 311 may output the coordinates on the spherical image VSS3 of the zenith ZE after the user US has rotated the spherical image VSS3 as the correction value CV3 to the server 306.

The server 306 may acquire the correction value CV3 from the image adjustment device 310 through the network and the communication unit 313. The server 306 stores the correction value CV3 in the built-in memory or the external memory in association with the user US or the image display device 304.

The image processor 311 detects the horizontal direction of the captured image IM3. However, the image processor 311 may be erroneously detect the horizontal direction of the captured image IM3, since it is difficult to detect the horizontal direction depending on the captured image IM3. In addition, the horizontal or zenith designation may be shifted due to problems such as system synchronization. In a case the horizontal direction of the captured image IM3 is erroneously detected or in a case the horizontal or zenith designation is deviated, the user US may feel a sense of incongruity, since the captured image IM3 displayed on the image display device 304 does not coincide with the gravity sensation of the user US.

When the user US operates the controller 305, the image adjustment system 301 performs a process similar to steps S101 to S108 of the flowchart illustrated in FIG. 3 or a process similar to steps S201 to S209 of the flowchart illustrated in FIG. 6. Therefore, by operating the controller 305 to rotate the spherical image VSS3, the user US can adjust the captured image IM3 displayed on the image display device 304 to be horizontal.

Figure 8:
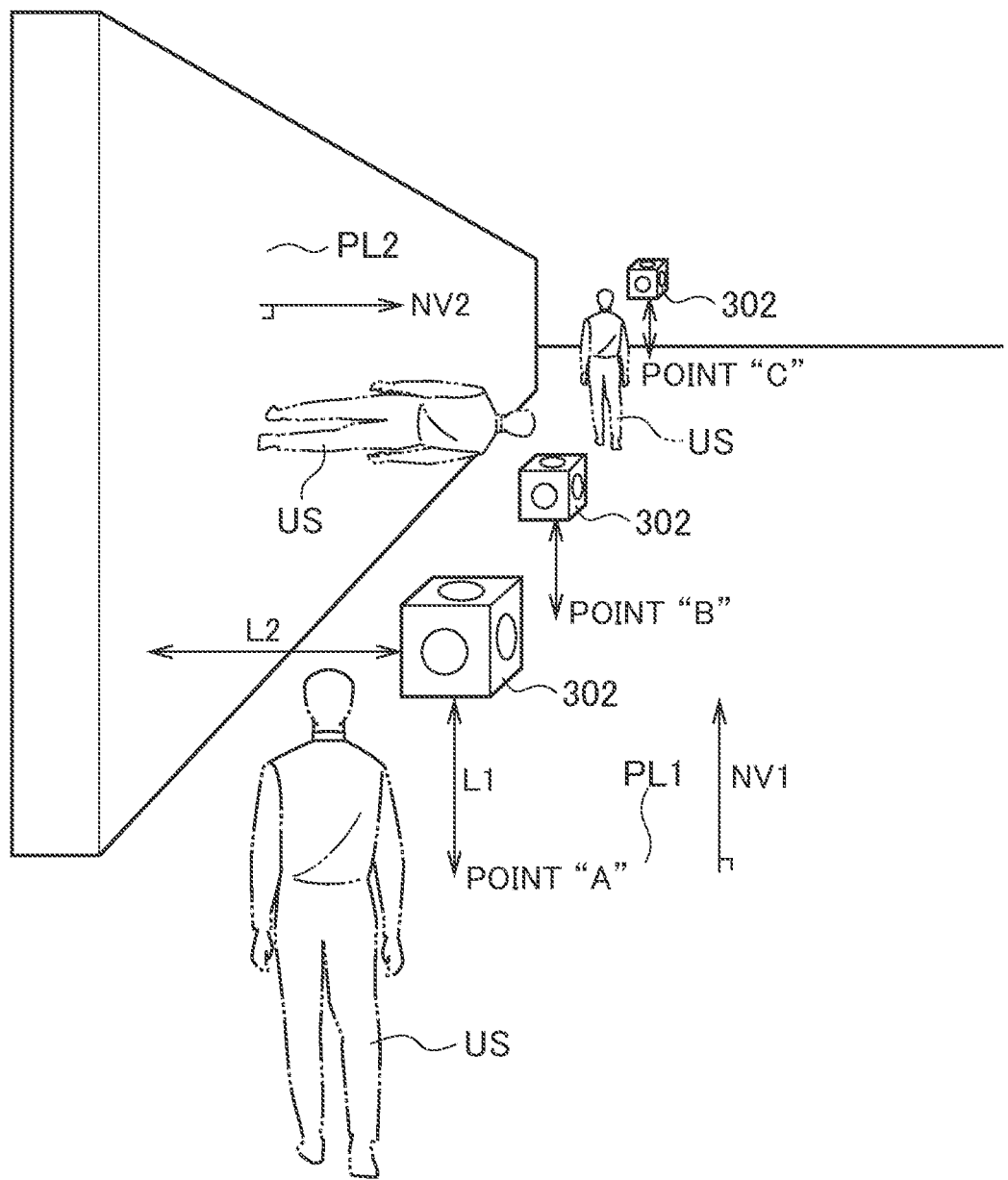
FIG. 8 is a figure schematically illustrating a relationship between a user and a horizontal plane when the camera is in motion.

FIG. 8 illustrates a state in which the camera 302 moves in the order of point A, point B, and point C, and a wall orthogonal to a ground surface is arranged on the left side of the camera 302, The ground surface is denoted as a first plane PIA and the wall surface is denoted as a second plane PL2. In the initial state, the first plane PL1 is a horizontal plane and the second plane PL2 is a vertical plane By moving the camera 302 in the order of point A, point B, and point C, the user US can feel as if the user US is moving in the order of point A, point B, and point C.

At the point A, the captured image IM3 is horizontally adjusted. Ina case the captured image IM3 is not horizontally adjusted, the user US operates the controller 305 to rotate the spherical image VSS3, whereby the captured image IM3 displayed on the image display device 304 is adjusted to be horizontal. The image processor 311 acquires a normal vector NV1 of the first plane PL1. The image processor 311 may also acquire the normal vector NV1 at the point B or C.

The image processor 311 detects a plane other than the first plane PL1 from the captured image IM3. The image processor 311 detects, for example, the second plane PL2. The image processor 311 determines whether or not the detected plane is located within a predetermined range. The image processor 311 determines whether, for example, the second plane PL2 is located within the predetermined range. The predetermined range will be described later.

Figure 9:
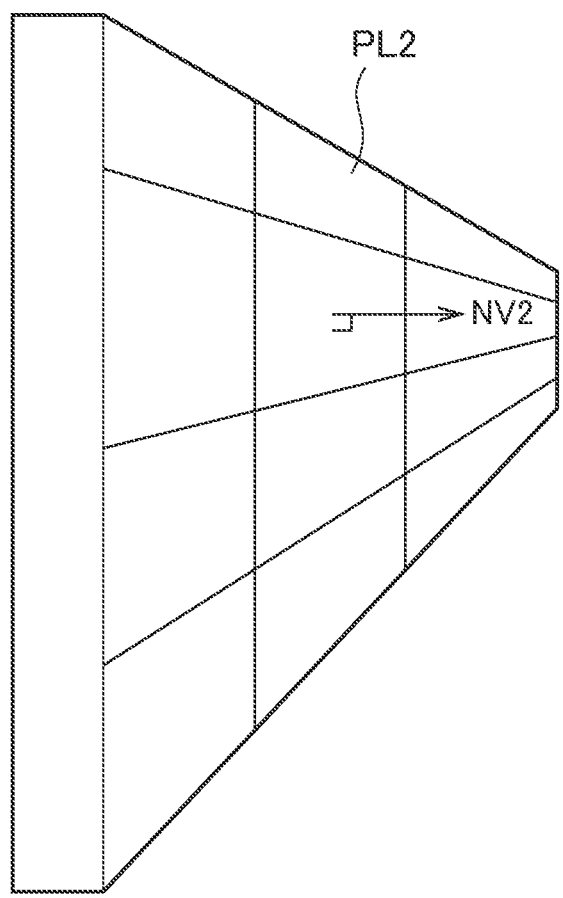
FIG. 9 illustrates an example of a wall surface.

When it is determined that the second plane PL2 is located within the predetermined range, the image processor 311 estimates a normal vector NV2 of the second plane PL2. As illustrated in FIG. 9, in a case the second plane PL2 has a plurality of linear patterns extending in the horizontal direction and in the vertical direction, the image processor 311 may estimate the normal vector NV2 based on the distortion of a rectangle formed by the plurality of linear patterns extending in the horizontal direction and the plurality of linear patterns extending in the vertical direction.

In a case the second plane PL2 has a concavo-convex shape and a shadow is formed corresponding to the concavo-convex shape, the image processor 311 may estimate the normal vector NV2 based on the shape of the shadow. In a case the second plane PL2 does not have significant feature and consequently it is difficult to estimate the normal vector NV2, a vector parallel to the first plane PL1 and directed from the second plane PL2 to the camera 302 may be set as the normal vector NV2. The image processor 311 acquires or has acquired the normal vector NV2 of the second plane PL2 at the point A. The image processor 311 may also acquire the normal vector NV2 at the point B or C.

In a case a plurality of planes other than the first plane PL1 are detected from the captured image IM3, the image processor 311 assigns a number for identifying each plane to each plane. The image processor 311 can superimpose at least one of a CG and a number corresponding to each plane on the captured image IM3 displayed on the image display device 304 at a position corresponding to each plane.

An example of the image adjustment method of the third embodiment will be described with reference to the flowcharts illustrated in FIGS. 10A and 10B. Specifically, an example of a method of changing the horizontal plane of the captured image IM3 displayed on the image display device 304 will be described. A case where the first plane PL1 is a horizontal plane at the point A, the second plane PL2 is changed to be a horizontal plane at the point B, and the first plane PL1 returns to be a horizontal plane at the point C will be described.

The image display device 304 is mounted on the head of the user US, and the controller 305 is mounted on the hand of the user US. The image display device 304 displays a captured image IM3. The camera 302 moves in the order of a point A, a point B and a point C. At the point A, the captured image IM3 is horizontally adjusted.

Figure 10A:
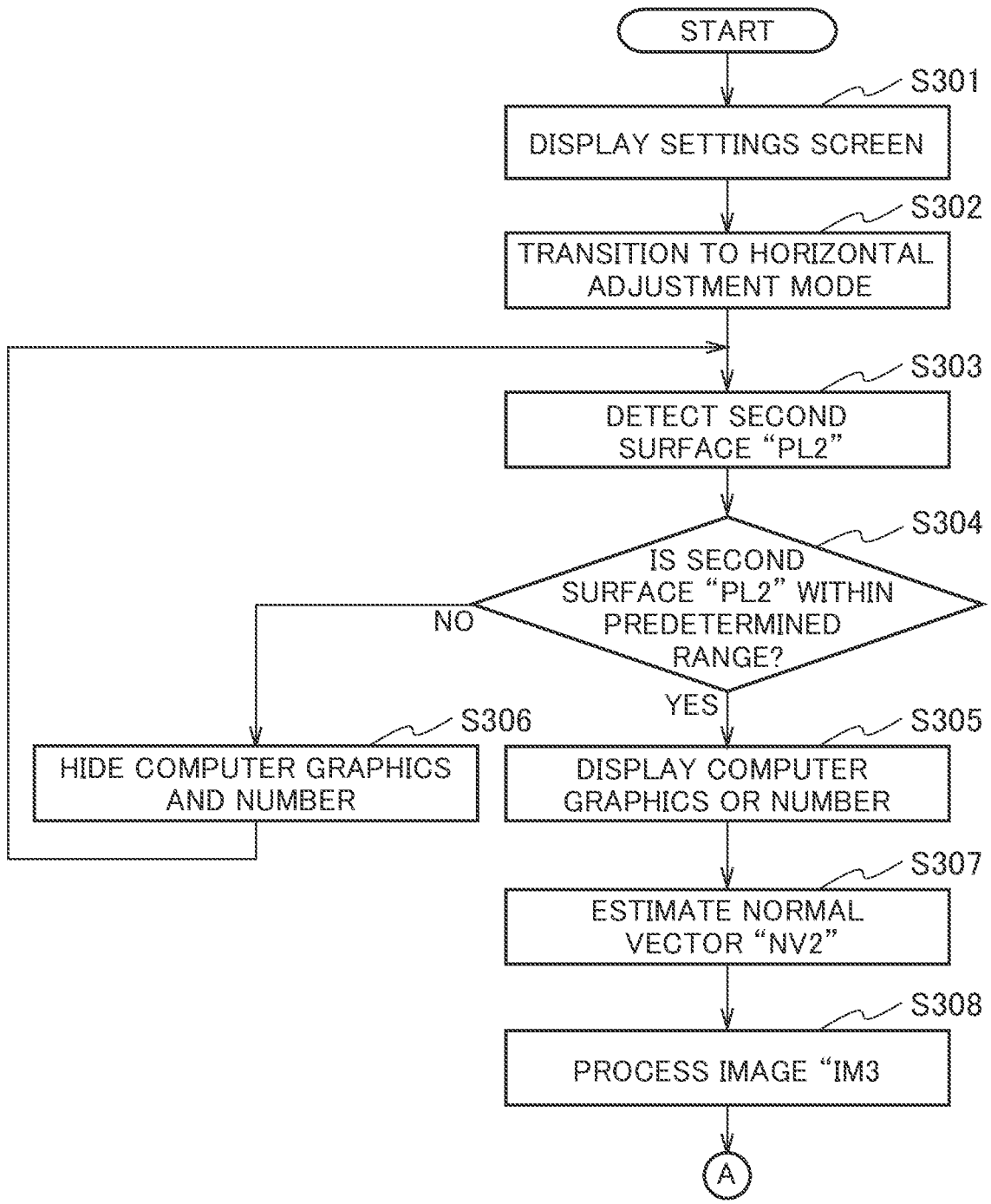
FIG. 10A is a flowchart illustrating an example of an image adjustment method according to a third embodiment.

In FIG. 10A, when the camera 302 moves or have been moved from the point A to the point B, the image processor 311 causes the image display device 304 to display a setting screen in step S301 in accordance with an operation to the controller 305 by the user US. When the user US operates the controller 305 to select a predetermined item displayed on the setting screen, for example, an item for changing the horizontal plane, the image processor 311 shifts the processing to a predetermined processing mode corresponding to the selected item in step S302. When the item for changing the horizontal plane is selected, the image processor 311 shifts the processing to a processing mode for changing the horizontal plane, that is, a horizontal plane change mode.

In step S303, the image processor 311 detects a plane other than the first plane PL1 from the captured image IM3 at the point B. The image processor 311 detects, for example, the second plane PL2. In step S304, the image processor 311 determines whether or not the detected plane is located within a predetermined range. The image processor 311 determines whether, for example, the second plane PL2 is located within a predetermined range.

If it is determined that the detected plane is located within the predetermined range (YES), the image processor 311 synthesizes the CG corresponding to the detected plane into the position corresponding to the plane detected in the captured image IM3 step S305, and displays it on the image display device 304. If it is determined that a plurality of planes are located within the predetermined range, a plurality of CGs corresponding to the plurality of planes are synthesized at positions corresponding to the plurality of planes in the captured image IM3, a number for identifying each plane is assigned to each plane, and is displayed on the image display device 304. If it is determined that the detected plane is not located within the predetermined range (NO), the image processor 311 does not combine the CG and number with the captured image IM3 in step S300, that is, does not display the CG nor the number, and returns the process to step S303.

When the user US operates the controller 305 to select, for example, a CG image or number corresponding to the second plane PL2, the image processor 311 estimates the normal vector NV2 of the second plane PL2 in step S307. In step S308, the image processor 311 processes the captured image IM3 based on the normal vector NV2 so that the second plane PL2 is a horizontal plane. In the state illustrated in FIG. 8, the image processor 311 rotates the captured image IM3 by 90 degrees counterclockwise. By this image processing, the user US can obtain the feeling of standing and moving on the wall surface, the wall surface being the second plane PL2.

As illustrated in FIG. 8, in order to obtain a feeling that the user US is standing and moving on a wall surface (the second plane PL2), the distance L2 between the camera 302 and the wall surface is important. In a case the distance L2 is too long, the user US feels as if the user US is floating from the wall surface, and in a case the distance L2 is too short, the user US feels as if the user US is buried in the wall surface. The distance L2 is preferably within a range of 0.7 L1<L2<1.5×L1 with respect to the distance L1 from the ground (the first plane PL1) to the camera 302. Therefore, the predetermined range in step S304 is, for example, 0.7×L1<L2<1.5×L1, Thus, the user US can obtain the feeling of standing on the wall surface and moving.

In FIG. 10B, when the camera 302 has been moves from the point B to the point C, or when the camera moves from the point B to the point C, the user US operates the controller 305 so that the image processor 311 causes the image display device 304 to display a setting screen in step S309. When the user US operates the controller 305 to select a predetermined item displayed on the setting screen, for example, an item for changing the horizontal plane, the image processor 311 shifts the processing to a predetermined processing mode corresponding to the selected item in step S310. When the item for changing the horizontal plane is selected, the image processor 311 shifts the processing to a processing mode for changing the horizontal plane, that is, a horizontal plane change mode.

In step S311, the image processor 311 detects, for example, the first plane PL1 and the second plane PL2 from the captured image IM3 at the point C. When the user US operates the controller 305 to select, for example, a CG or number corresponding to the first plane PL1, the image processor 311 processes the captured image IM3 in step S312 based on the normal vector NV1 so that the first plane PL1 becomes a horizontal plane. In the state illustrated in FIG. 8, the image processor 311 rotates the captured image IM3 by 90 degrees clockwise. By this image processing, the user US can obtain a feeling of standing and moving on the ground, which is the first plane PL1.

In steps S301 and S302, and in steps S309 and S310, although the user US operates the controller 305 to select a predetermined plane PL, the server 306 or the image adjustment device 310 may select an arbitrary plane PL at an arbitrary time and process the captured image 113 in accordance with the selected plane PL. In a case a plurality of users US view the captured image IM3 via the network, any one of the users US may select an arbitrary plane PL to the other users US at an arbitrary time. In a case the user US use the image display device 304 in an attraction or the like, the operator of the attraction may select any plane PL at any time.

In the image adjustment system 301, the image adjustment device 310, and the image adjustment method according to the third embodiment, the image display device 304 displays the spherical image VSS3, According to the image adjustment system 301, the image adjustment device 310, and the image adjustment method of the third embodiment, in a case the horizontal direction of the captured image IM3 is erroneously detected or in a case the designation of horizontal or zenith ZE is deviated, the user US operates the controller 305 to rotate the spherical image VSS3, so that the captured image IM3 displayed on the image display device 304 can be adjusted to be horizontal.

In the image adjustment system 301, the image adjustment device 310, and the image adjustment method of the third embodiment, the correction value CV3 is associated with the user US or the image display device 304 and stored in the server 306. The image adjustment device 310 horizontally adjusts the captured image IM3 captured by the camera 302 based on the correction value CV3, and can display the horizontally adjusted image IM3 on the image display device 304.

Therefore, according to the image adjustment system 301, the image adjustment device 310, and the image adjustment method of the third embodiment, in a case the horizontal direction of the captured image IM3 is erroneously detected or in a case the designation of horizontal or zenith is deviated, the user US can easily correct the horizontal or zenith of the captured image IM3.

In the image adjustment system 301, the image adjustment device 310, and the image adjustment method according to the third embodiment, a plane other than the ground is detected, whether or not the detected plane is located within a predetermined range is determined, and a normal vector NV2 on the plane located within the predetermined range is estimated. According to the image adjustment system 301, the image adjustment device 310, and the image adjustment method according to the third embodiment, the captured image IM3 can be rotated based on the normal vector NV2 so that the designated plane PL2 becomes a horizontal plane. In a case the designated plane PL2 is a wall surface, the user US can obtain a feeling of standing and moving on the wall surface.

Fourth Embodiment

A configuration example of the image adjustment system according to the fourth embodiment will be described with reference to FIG. 4. The image adjustment system 401 includes a camera 402, a communication unit 403, an image display device 404, a controller 405, an image adjustment device 410, and a server 406. The image adjustment device 410 has an image processor 411, an image generator 412, and a communication unit 413.

The camera 402, the communication unit 403, the image display device 404, the controller 405, the image adjustment device 410, and the server 406 correspond to the camera 202, the communication unit 203, the image display device 204, the controller 205, the image adjustment device 210, and the server 206 of the second embodiment, respectively. The image processor 411, the image generator 412, and the communication unit 413 correspond to the image processor 211, the image generator 212, and the communication unit 213 of the second embodiment, respectively.

The image adjustment device 410 can acquire a captured image IM4 captured by the camera 402 through the communication units 403 and 413 and a network. The server 406 is connected through a network and a communication unit 403 to the camera 402, and connected through the network and the communication unit 413 to the image adjustment device 410.

The server 406 may acquire the captured image IM4 via the communication unit 403 and the network, and the image adjustment device 410 may acquire the captured image 114 from the server 406 via the network and the communication unit 413.

The captured image IM4 acquired by the image adjustment device 410 is input to the image processor 411. The image processor 411 analyzes the captured image IM4 to recognize the horizontal direction of the captured image IM4. The image adjustment device 410 may analyze the captured image IM4 to recognize the vertical direction of the captured image 114, or may recognize the horizontal direction and the vertical direction. The image adjustment device 410 corrects distortion of the captured image IM4, performs image processing such as adjustment of the horizontal position of the captured image IM4, and outputs the image-processed captured image IM4 to the image display device 404. The image display device 404 displays a captured image IM4.

The server 406 may acquire the captured image IM4 from the camera 402 via the network and the communication unit 403, may correct distortion of the captured image IM4, may perform image processing such as adjusting the horizontal position of the captured image IM4, and may output the image-processed captured image IM4 to the image adjustment device 410. By mounting the image display device 404 to the head of the user US, the user US can view the captured image IM4 subjected to image processing by the image adjustment device 410 or the server 406.

The image display device 404 generates attitude information PN4 based on a direction in which the user US faces and a state such as the attitude of the user US in a state of being mounted on the head of the user US. An image processor 411 acquires attitude information PN4 from an image display device 404. That is, the image processor 411 acquires the attitude information PN4 based on the attitude of the image display device 404, The image processor 411 displays, on the basis of the posture information PN4, an image of an area corresponding to the direction in which the user US faces and the posture of the user US from the captured image IM4 captured by the camera 402 on the image display device 404.

The controller 405 generates instruction information NN4 based on a state such as the movement or posture of the hand of the user US in a state of being mounted on the hand of the user US. The image processor 411 acquires instruction information NN4 from a controller 405. The image processor 411 can change or adjust the image displayed on the image display device 404 based on the instruction information NN4.

The image generator 412 generates a spherical image VSS4, the spherical image VSS4 being a virtual image formed by CG with a spherical surface. The image generator 412 stores the spherical image VSS4 in a built-in memory or an external memory.

The image processor 411 acquires the spherical image VSS4 from the image generator 412 based on the instruction information NN4, and displays the spherical image VSS4 on the image display device 404. The spherical image VSS4 corresponds to the spherical image VSS2 of the second embodiment. The user US feels that the hand of the user US is in contact with the spherical image VSS4 by moving the hand on which the controller 405 is mounted to a position corresponding to the spherical image VSS4 displayed on the image display device 404.

The controller 405 may have an actuator placed at a part to be in contact with the hand of the user US. On the basis of the instruction information NN4, the image processor 411 operates the actuator when it is determined that the hand of the user US has moved to a position corresponding to the spherical image VSS4. When the actuator applies pressure to the hand of the user US, the user US can actually feel the feeling that the hand is in contact with the spherical image VSS4.

In a state where the spherical image VSS4 is displayed on the image display device 404, when the user US moves the hand on which the controller 405 is mounted in an arbitrary direction, the image processor 411 performs image processing based on the instruction information NN4 so that the spherical image VSS4 and the captured image IM4 displayed on the image display device 404 move in accordance with the moving direction of the hand of the user US, the moving speed, and the position of the movement destination.

The user US can rotate the spherical image VSS4 in any direction at any speed to any position by moving the hand in any direction at any speed to any position. That is, the user US can rotate the spherical image VSS4 by the movement of the hand. The image processor 411 moves the captured image IM4 in accordance with the rotation of the spherical image VSS4.

In a case where a horizon line or a building appears on a captured image IM4 captured by a camera 402, the image adjustment device 410 and the server 406 can accurately recognize the horizontal direction of the captured image IM4. However, in a case the captured image IM4 captured by the camera 402 is, for example, an image composed only of curves such as natural scenery, the image adjustment device 410 and the server 406 may not recognize the horizontal direction of the captured image IM4 with high accuracy.

In a case the horizontal direction of the captured image IM4 cannot be accurately recognized, the image display device 404 may display the captured image IM4 in an inclined state. The user US can adjust the captured image IM4 to be horizontal by rotating the spherical image VSS4.

With reference to the flowchart illustrated in FIG. 11, an example of an image adjustment method of the fourth embodiment will be described. Specifically, an example of a method of adjusting the horizontal position of the captured image IM4 captured by the camera 402 will be described.

Figure 12A:
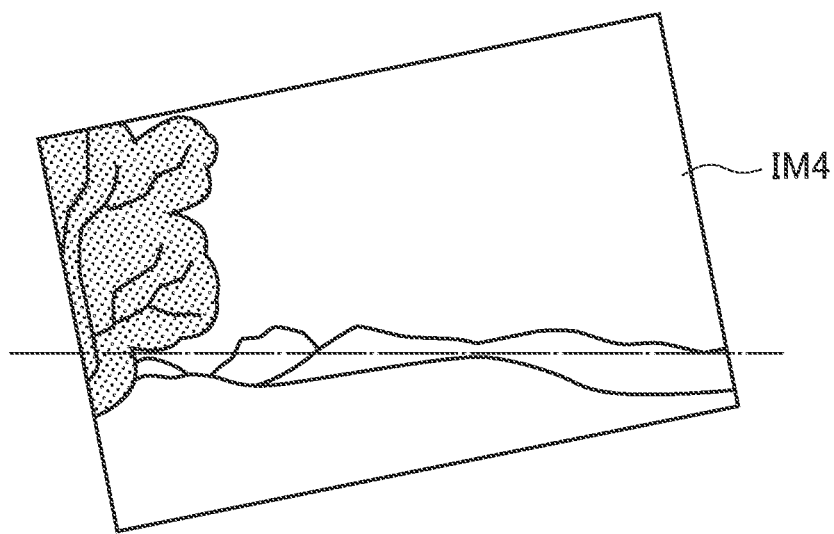
FIG. 12A is a figure illustrating an example of an image displayed on the image display device.
Figure 12B:
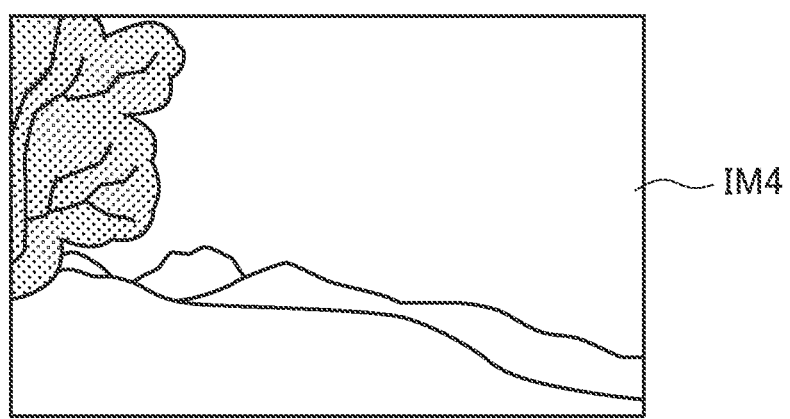
FIG. 12B is a figure illustrating a state in which the image illustrated in FIG. 12A is horizontally adjusted.

The server 406 performs the similar process as in step S201 illustrated in FIG. 6. As illustrated in FIG. 12A, when the user US determines that the captured image IM4 displayed on the image display device 404 is not horizontal, and the user US operates the controller 405, the image adjustment system 401 performs the similar processing as in steps S202 to S207 illustrated in FIG. 6. Thus, as illustrated in FIG. 12B, the captured image IM4 displayed on the image display device 404 can be horizontally adjusted.

The image processor 411 can determine to which position on the coordinate of the spherical image VSS4 the zenith ZE of the spherical image VSS4 before being rotated by the user US has moved by the user US rotating the spherical image VSS4. The image processor 411 calculates a variation of the spherical image VSS4 before and after the user US rotates the spherical image VSS4 based on the moving direction and the position of the moving destination of the zenith ZE on the coordinate of the spherical image VSS4. The variation of the spherical image VSS4 corresponds to the variation of the spherical image VSS2 of the second embodiment.

The image processor 411 calculates the rotation angle RA as a variation of the spherical image VSS4. The rotation angle RA is a rotation angle of the spherical image VSS4 after a rotation of the spherical image VSS4 with respect to a state before the rotation of the spherical image VSS4 performed by the user US. The rotation angle RA may be a rotation angle rotated with X axis, the Y axis, or the Z axis as a rotation axis, or a combined rotation angle rotated with X axis, the Y axis, and the Z axis as a rotation axis.

The image adjustment system 401 performs the similar processing as in steps S208 and S209 illustrated in FIG. 6. The image processor 411 outputs the variation of the spherical image VSS4 as the correction value CV4 to the server 406 via the communication unit 413 and the network. The correction value CV4 includes information of the rotation angle RA. The server 406 may acquire the correction value CV4 through the network and the communication unit 413 from the image adjustment device 410.

In FIG. 11, the server 406 acquires the rotation angle RA in step S401. In step S402, the server 406 determines whether or not the rotation angle RA is equal to or larger than a predetermined angle. That is, the server 406 determines whether or not the user US rotates the spherical image VSS4 to horizontally adjust the captured image IM4 displayed on the image display device 404 to a predetermined angle or more, for example, 10 degrees or more.

If it is determined that the rotation angle RA is equal to or larger than a predetermined angle (YES), the server 406 determines in step S403 that the horizontal adjustment of the captured image IM4 captured by the camera 402 by the image adjustment device 410 or the server 406 has failed, and stores the captured image IM4b before the horizontal adjustment by the user US and the captured image IM4a after the horizontal adjustment in association with each other. If it is determined that the rotation angle RA is smaller than the predetermined angle (NO), the image adjustment system 401 returns the process to step S401.

In step S404, the server 406 determines whether or not the number of stored captured images IM4b and IM4a is equal to or larger than a predetermined value. If it is determined that the number of stored captured images IM4b and IM4a is equal to or larger than a predetermined value (YES), the server 406 performs a learning process such as deep learning on the plurality of stored captured images IM4b and IM4a in step S405. The server 406 performs a learning process using, for example, the captured image IM4b as input data and the captured image IM4a as correct answer data. If it is determined that the number of stored captured images IM4b and IM4a is smaller than the predetermined value (NO), the image adjustment system 401 returns the process to step S401.

In step S406, the server 406 horizontally adjusts, based on the learning result in step S405, the captured image IM4 captured by the camera 402, in step S406, the server 406 may output the learning result to the image adjustment device 410, and the image processor 411 may horizontally adjust the captured image IM4 captured by the camera 402 based on the learning result. The image processor 411 may perform the processing of steps S401 to S406.

In a case the server 406 or the image processor 411 repeatedly performs the processes of steps S401 to S406, the horizontal adjustment accuracy of the captured image IM4 displayed on the image display device 404 can be improved.

In the image adjustment system 401, the image adjustment device 410, and the image adjustment method according to the fourth embodiment, the image display device 404 displays the spherical image VSS4. According to the image adjustment system 401, the image adjustment device 410, and the image adjustment method of the fourth embodiment, in a case the horizontal direction of the captured image IM4 is erroneously detected or in a case the designation of the horizontal direction or the zenith ZE is deviated, the user US operates the controller 405 to rotate the spherical image VSS4, so that the captured image IM4 displayed on the image display device 404 can be adjusted to be horizontal.

In the image adjustment system 401, the image adjustment device 410, and the image adjustment method according to the fourth embodiment, the correction value CV4 is stored in association with the user US or the image display device 404 in the server 406 or an external memory of the server 406. Based on the correction value CV4, the image adjustment device 410 can adjust the captured image IM4 captured by the camera 402 and display the image on the image display device 404.

Therefore, according to the image adjustment system 401, the image adjustment device 410, and the image adjustment method of the fourth embodiment, in a case the horizontal direction of the captured image IM4 is erroneously detected or in a case the designation of horizontal or zenith is deviated, the user US can easily correct the horizontal or zenith of the captured image IM4.

In the image adjustment system 401, the image adjustment device 410, and the image adjustment method of the fourth embodiment, in a case the rotation angle RA of the spherical image VSS4 is equal to or larger than a predetermined angle, it is determined that the horizontal adjustment has failed, and based on the determination result, learning processing is performed for the captured images IM4*b* and IM4*a* for which the horizontal adjustment has failed. According to the image adjustment system 401, the image adjustment device 410, and the image adjustment method of the fourth embodiment, by performing the learning process, an accuracy of the horizontal adjustment of the captured image IM4 displayed on the image display device 404 can be improved.

The present invention is not limited to the above-described embodiments, and various modifications can be made without departing from the gist of the present invention.

For example, the virtual image VSS generated by the CG may be an ellipsoidal surface (ellipsoid), and may be any closed surface (closed curved surface) within the reach of the user US. That is, it is only necessary to obtain a feeling that the user US comes in contact with the closed curved surface from the inside, so that the horizontal adjustment of the captured image IM can be performed. Since the user US rotates the virtual image VSS, the virtual image VSS preferably has a spherical shape close to a spherical, such as a spherical surface or an elliptical surface.

What is claimed is:

1. An image adjustment system comprising:
a camera;
an image adjustment device configured to adjust a captured image captured by the camera;
an image display device configured to display the captured image adjusted by the image adjustment device; and
a controller configured to output instruction information to the image adjustment device, wherein
the image adjustment device includes:
an image generator configured to generate a spherical image;
an image processor configured to acquire the spherical image from the image generator based on the instruction information and display the spherical image on the image display device, and configured to rotate the spherical image based on the instruction information and adjust the captured image displayed on the image display device in accordance with the rotation of the spherical image, wherein the camera is an omnidirectional camera configured to capture an image covering 360 degrees,
the image display device is a head-mount display configured to mount on a head of a user,
the controller is a glove-type controller configured to mount on a hand of the user, and
when the user views the spherical image displayed on the image display device while the image display device is mounted on the head of the user, the spherical image is a virtual image disposed around the user and the image display device and set to display within a range the hand of the user or a finger of the user that reaches the spherical image
the image adjustment system further comprises a server configured to specify the image display device or a user of the image display device, and
the server is configured to determine whether a rotation angle of the spherical image before and after the rotation of the spherical image is equal to or larger than a predetermined angle, and when the rotation angle is determined to be equal to or larger than the predetermined angle, the server stores the captured image before adjustment and the captured image after adjustment, adjusted by the image processor, in association with each other.

2. The image adjustment system according to claim 1, wherein
when the user moves the hand or the finger of the user in an arbitrary direction while the controller is mounted on the hand of the user, the image processor rotates the spherical image in accordance with the movement of the hand or the finger of the user based on the instruction information, and adjusts the captured image displayed on the image display device in accordance with the rotation of the spherical image.

3. The image adjustment system according to claim 2, wherein
the image processor is configured to acquire a variation of the captured image before and after the spherical image is rotated, and configured to adjust the captured image based on the variation.

4. The image adjustment system according to claim 3, wherein
the image adjustment system further comprises a server configured to specify the image display device or a user of the image display device, and
the server is configured to store the variation in association with the image display device or the user specified by the server.

5. The image adjustment device comprising:
an image generator configured to generate a spherical image;
an image processor configured to acquire the spherical image from the image generator based on an instruction information acquired from a controller and display the spherical image on an image display device, and configured to rotate the spherical image based on the instruction information and adjust the captured image captured by a camera and displayed on the image display device in accordance with the rotation of the spherical image, wherein the image display device is specified by a server,
wherein the captured image before adjustment and the captured image after adjustment are stored on a server in association with each other when a rotation angle of the spherical image before and after rotation of the spherical image is equal to or greater than a predetermined angle.

6. The image adjustment system according to claim 1, wherein
the server is configured to determine whether or not number of the captured images before and after adjustment being stored is equal to or greater than a predetermined value, and configured to perform a learning process on the captured images before and after adjustment when the number of the captured images before and after adjustment being stored is determined to be equal to or greater than the predetermined value and output a learning result to the image adjustment device,
the image processor configured to adjust the captured image displayed on the image display device based on the learning result.

7. The image adjustment system according to claim 1, wherein
the image processor is configured to adjust horizontal position of the captured image displayed on the image display device in accordance with the rotation of the spherical image.

8. The image adjustment system according to claim 1, wherein
the image processor is configured to adjust a horizontal position of the captured image and detect a second plane other than a first plane, which is a horizontal plane in the captured image, adjust the captured image so as the second plane to be a horizontal plane when the second plane is selected in accordance with the instruction information.

9. The image adjustment system according to claim 4, wherein
the image processor is configured to adjust a horizontal position of the captured image and detect a second plane other than a first plane, which is a horizontal plane in the captured image, adjust the captured image so as the second plane to be a horizontal plane when the second plane is selected in accordance with the instruction information.

10. The image adjustment device according to claim 5, wherein
the image processor is configured to adjust a horizontal position of the captured image in accordance with the rotation of the spherical image and detect a second plane other than a first plane, the first plane being a horizontal plane in the captured image, adjust the captured image so as the second plane to be a horizontal plane when the second plane is selected in accordance with the instruction information.

11. An image adjustment method comprising:
acquiring an instruction information from a controller with an image processor;
acquiring a spherical image from an image generator with the image processor based on the instruction information;
displaying the spherical image with an image display device;
rotating the spherical image with the image processor based on the instruction information;
adjusting a captured image, which is captured by a camera and displayed on the image display device, with the image processor in accordance with the rotation of the spherical image,
the image adjustment method further comprising:
specifying the image display device with a server; and
displaying the spherical image acquired from the image generator with the image display device specified by the server,
the image adjustment method further comprising:
determining whether a rotation angle of the spherical image before and after the rotation of the spherical image is equal to or larger than a predetermined angle with the server;
storing the captured image before adjustment and the captured image after adjustment, adjusted by the image processor, in association with each other with the server when the rotation angle is determined to be equal to or larger than the predetermined angle.

12. The image adjustment method according to claim 11, the image adjustment method further comprising:
adjusting a horizontal position of the captured image, which is captured by a camera and displayed on the image display device, in accordance with the rotation of the spherical image by the image processor;
detecting a second plane other than a first plane, the first plane being a horizontal plane in the captured image;
adjusting the captured image so as the second plane to be a horizontal plane when the second plane is selected in accordance with the instruction information.

* * * * *